United States Patent
Maree (10) Patent No.: US 6,863,819 B2
(45) Date of Patent: Mar. 8, 2005

(54) WATER TREATMENT METHOD

(75) Inventor: Johannes Phillippus Maree, Pretoria (ZA)

(73) Assignee: CSIR, Pretoria (ZA)

(*) Notice: Subject to any disclaimer, the term of this patent is extended or adjusted under 35 U.S.C. 154(b) by 0 days.

(21) Appl. No.: 10/362,277

(22) PCT Filed: Aug. 21, 2001

(86) PCT No.: PCT/IB01/01513

§ 371 (c)(1),
(2), (4) Date: Feb. 20, 2003

(87) PCT Pub. No.: WO02/16272

PCT Pub. Date: Feb. 28, 2002

(65) Prior Publication Data

US 2003/0160003 A1 Aug. 28, 2003

(51) Int. Cl.$^7$ .................................................. C02F 1/64
(52) U.S. Cl. ........................... 210/631; 44/621; 44/624; 210/713; 210/716; 210/718; 210/721; 210/724; 210/726; 210/912; 423/636
(58) Field of Search ................... 44/621, 624; 210/713, 210/716, 718, 721, 722, 723, 724, 726, 727, 912, 913, 631; 423/34, 55, 101, 140, 636

(56) References Cited

U.S. PATENT DOCUMENTS

| 3,630,504 | A | * | 12/1971 | Reynolds | .................. | 423/175 |
| 3,736,254 | A | | 5/1973 | Croom | | |
| 3,960,513 | A | * | 6/1976 | Agarwal et al. | ............... | 44/625 |
| 4,059,513 | A | * | 11/1977 | Zadera | ........................ | 210/696 |
| 4,076,620 | A | | 2/1978 | Opferkuch, Jr. et al. | | |
| 5,035,807 | A | * | 7/1991 | Maree | .......................... | 210/711 |
| 5,156,746 | A | | 10/1992 | Maree et al. | | |
| 5,954,969 | A | * | 9/1999 | Hedin | .......................... | 210/709 |
| 6,280,630 | B1 | * | 8/2001 | Ramsay | ........................ | 210/711 |
| 6,419,834 | B1 | * | 7/2002 | Maree | .......................... | 210/722 |

FOREIGN PATENT DOCUMENTS

| EP | 0072885 | 3/1983 |
| JP | 01075093 | 3/1989 |
| WO | WO 99/01383 | 6/1998 |
| ZA | 984724 | 6/1998 |

* cited by examiner

Primary Examiner—Peter A. Hruskoci
(74) Attorney, Agent, or Firm—Klarquist Sparkman LLP (57) ABSTRACT

The invention provides a method treating acid raw water including the step of neutralising the water by adding calcium carbonate to it in a neutralising stage. The neutralised water is then rendered alkaline or more alkaline by adding an alkali thereto selected from calcium hydroxide, calcium oxide and mixtures thereof in a lime treatment stage. The alkaline water is then treated with carbon dioxide in a carbon dioxide treatment stage, with the carbon dioxide reacting in the carbon dioxide treatment stage with calcium hydroxide dissolved in the water.

16 Claims, 2 Drawing Sheets

WATER TREATMENT METHOD

CROSS REFERENCE TO RELATED APPLICATIONS

This is the U.S. National Stage of International Application No. PCT/IB01/01513, filed Aug. 21, 2001 (published in English under PCT Article 21(2)), which in turn claims a right of priority from South African Application No. 2000/4290, filed Aug. 21, 2000. Both applications are incorporated herein in their entirety.

This invention relates to the treatment of water. More particularly, the invention relates to a method of treating raw water, suitable for the treatment of acid raw water, in particular acid water containing sulphate anions.

According to the invention, there is provided a method of treating acid raw water containing sulphate anions, the method including the steps of neutralising the raw water by adding calcium carbonate to the raw water in a neutralising stage, rendering the neutralised water alkaline or more alkaline by adding thereto an alkali selected from the group consisting of calcium hydroxide, calcium oxide and mixtures thereof in a lime treatment stage, and then treating alkaline water from the lime treatment stage with carbon dioxide in carbon dioxide treatment stage, the carbon dioxide reacting, in the carbon dioxide treatment stage, with calcium hydroxide dissolved in the water, the treating of the alkaline water with carbon dioxide including feeding carbon dioxide produced in the neutralising step according to the reaction:

$$H_2SO_4 + CaCO_3 \rightarrow CaSO_4 + H_2O + CO_2\uparrow$$

into the alkaline water from the lime treatment stage, to react with calcium hydroxide in the water at a pH of not less than 8.6 according to the reaction:

$$Ca(OH)_2 + CO_2 \rightarrow CaCO_3\downarrow H_2O.$$

While treating the alkaline water from the lime treatment stage with carbon dioxide in the carbon dioxide treatment stage can act to reduce the pH of the water in the carbon dioxide treatment stage to a value below 8.6 to produce dissolved calcium bicarbonate in the water, it is expected that the carbon dioxide addition will usually act to reduce the pH to a minimum value which is no less than 8.6, so that calcium carbonate precipitation will take place in the carbon dioxide treatment stage. Accordingly, the carbon dioxide treatment stage may form a calcium carbonate precipitation stage, the carbon dioxide treatment lowering the pH in the carbon dioxide treatment stage to a minimum value of no less than 8.6, and causing precipitation of calcium carbonate from the water in the carbon dioxide treatment stage.

Typically, in the neutralization stage, a raw water with a pH of below 5, is treated by the addition of particulate calcium carbonate thereto, to increase its pH to 5–8.5, eg about 7. In the lime treatment stage, in turn, particulate calcium hydroxide and/or calcium oxide is added to the neutralized water from the neutralization stage, to raise its pH to about 9–12.6, eg about 12. In particular, the neutralizing of the raw water may be by adding particulate calcium carbonate thereto, the neutralizing acting to increase the pH of the raw water from a value of below 5, to a value, in the neutralized water, of 5–8.5, the rendering of the neutralized water alkaline or more alkaline acting to raise the pH of the water to a value to 9–12.6, before the treating of the alkaline water with carbon dioxide takes place.

In the neutralization stage, the calcium salt of the acid is produced, together with carbon dioxide. Frequently, the raw water contains sulphate anions, the acid being sulphuric acid, so that the neutralization reaction is:

$$H_2SO_4 + CaCO_3 \rightarrow CaSO_4 + H_2O + CO_2\uparrow$$

In this case, at pH's of 7 or less, the $CaSO_4$ remains partially in solution and gaseous $CO_2$ is produced, which can be employed later, as described hereunder. Some of the $CaSO_4$ will crystallize as $CaSO_4.2H_2O$ (gypsum). The gaseous $CO_2$ produced in the neutralization stage may be withdrawn from the neutralization stage under vacuum or by stripping it from the water in the neutralization stage with air.

In addition to sulphate anions, the raw water often contains dissolved cations, such as $Fe^{3+}$, $Fe^{2+}$, $Al^{3+}$, $Ti^{2+}$, $Zn^{2+}$, $Mn^{2+}$, $Mg^{2+}$ and also $Ca^{2+}$ cations. Accordingly, in the neutralization step, the hydroxides of these cations which are insoluble at pH's of 7 or less, will precipitate, eg $Fe(OH)_3$ and $Al(OH)_3$. In accordance with the method of the invention such hydroxide precipitates may be separated from the water in a separation step such as a filtration step or preferably a settling step, optionally employing a coagulant and/or a flocculant, following the neutralization step, and sludge may be recirculated from this separation step to the neutralization step, to maintain a solids concentration of 10–300 g/l in the neutralization step, the remaining sludge from this separation step being discarded to waste or being conveyed, with the water being treated, from the neutralization step to the lime treatment step. In a particular embodiment of the invention, in which the raw water contains sulphate anions, calcium cations and one or more metal cations selected from the group consisting of $Fe^{3+}$, $Fe^{2+}$, $Al^{3+}$, $Ti^{2+}$, $Zn^{2+}$, $Mn^{2+}$ and $Mg^{2+}$ cations, the method may include separating from the water as a sludge the hydroxides of any metal cations of said group which are present in the raw water and which give rise to solid hydroxides in the neutralizing step, and recirculating sufficient of the separated sludge to the neutralising step to maintain a solids concentration of 5–300 g/l in the neutralizing stage.

If desired, $Fe(OH)_3$ precipitation in the neutralization step can be improved and promoted by aeration to oxidize $Fe^{2+}$ cations to $Fe^{3+}$ cations, and this oxidation may be promoted by agitation of the water in the neutralization step. Accordingly, when the raw water contains $Fe^{2+}$ cations, the method may include agitating and aerating the water in the neutralizing stage to promote oxidation of the $Fe^{2+}$ cations to $Fe^{3+}$ cations in the neutralizing stage, which $Fe^{3+}$ cations become insoluble at a lower pH than the pH at which the $Fe^{2+}$ cations become insoluble. In the lime treatment step $Fe(OH)_2$, $Mn(OH)_2$, $Fe(OH)_2$ and $CaSO_4$ are typically precipitated, and ettringite ($3CaSO_4.Al_2O_3.3CaO.31H_2O$) is optionally precipitated, and the lime treatment step may also incorporate a separation step such as a filtration step or a settling step, where a calcium sulphate sludge, optionally containing the above hydroxides and/or ettringite when they are produced in the neutralization step and/or in the lime treatment step, is settled from the water being treated. When solid calcium sulphate forms in the water in the lime treatment stage, the method may include the step of separating a calcium sulphate-containing sludge from the water in the lime treatment stage before the treating of the alkaline water with calcium dioxide takes place.

When the raw water contains $Zn^{2+}$ cations, any $Fe^{3+}$, $Fe^{2+}$ and/or $Al^{3+}$ cations dissolved in the water can be removed in the neutralization stage by precipitating the hydroxides thereof, leaving the $Zn^{2+}$ cations for removal in the lime treatment stage. Although zinc can be removed in the neutralization stage, this is not preferred, because of long reaction times and the need for carbon dioxide stripping.

In accordance with the method of the invention, the lime treatment step is as described above, followed typically by a calcium carbonate precipitation step, and the calcium carbonate precipitation step in turn may be followed by a final treatment step, the calcium carbonate precipitation step, when employed, taking place between the lime treatment step and the final treatment step, in the direction of flow of the water being treated.

The calcium carbonate precipitation step, can employ carbon dioxide gas from the neutralizing step, carbon dioxide from the neutralizing step being fed into water obtained from the lime treatment step, after settling of solids therefrom, to react with lime in the water and reduce the pH of the water to below 9 and as low as about 8.6, according to the reaction:

$$Ca(OH)_2 + CO_2 \rightarrow CaCO_3\downarrow + H_2O.$$

In other words, the treating of the alkaline water with carbon dioxide may include feeding carbon dioxide produced in the neutralizing step according to the reaction:

$$H_2SO_4 + CaCO_3 \rightarrow CaSO_4 + H_2O + CO_2\uparrow$$

into the alkaline water from the lime treatment stage, to react with calcium hydroxide in the water at a pH of at least 8.6 according to the reaction:

$$Ca(OH)_2 + CO_2 \rightarrow CaCO_3\downarrow + H_2O.$$

This precipitated calcium carbonate can be employed to supplement a feed of calcium carbonate from a calcium carbonate bulk supply to the neutralization step, or, as it will be of high purity, it can be sold as a by-product. The water produced is, furthermore, undersaturated as regards calcium sulphate or gypsum.

It is contemplated that, in practice, for the treatment of acid water, such as acid mine water or acid coal washing water, containing sulphate anions and at least some of said metal cations, the calcium carbonate will be obtained from a bulk supply, such as a supply of limestone, or as a by-product from another industry, such as the paper production industry, and in powder form. This supply of limestone can be used to provide CaO, by burning the $CaCO_3$ at 800–900° C. according to the reaction:

$$CaCO_3 \rightarrow CaO + CO_2\uparrow$$

the CaO being used in the lime treatment step and the $CO_2$ optionally being used to supplement or supplant the $CO_2$ from the neutralization step, and which is used in the calcium carbonate precipitation step. Heat derived from this burning can be used to raise the water temperature, to promote gypsum crystallization from the water.

When the calcium carbonate which is burnt is limestone powder, the burnt product will contain both pure CaO particles and impure CaO particles. These particles can be separated, conveniently gravimetrically, eg in a fluidized bed as $Ca(OH)_2$, into a pure fraction and an impure fraction, the pure fraction being used in the lime treatment step, in particular in the later part thereof, when the lime treatment step is carried out in several reaction zones, and the impure fraction being used to treat the water in the earlier part of the lime treatment step, when several such reaction zones are employed. Optionally the neutralization step can incorporate a settling step for settling solids in the water before the water enters the lime treatment step, and solids settled in this settling step can be recirculated to the neutralization step to provide the neutralization step with said solids content, eg 5–300 g/l, suitable for facilitating oxidation of $Fe^{2+}$ cations to $Fe^{3+}$ cations by aeration and agitation, and for facilitating gypsum crystallization. Similarly, sludge settled from the water in the lime treatment step can be recirculated to the lime treatment step to maintain a solids content in the lime treatment step of 5–300 g/l, to facilitate gypsum crystallization. As indicated above, when adding the alkali to the neutralized water is by adding lime thereto, the method may include, as a preliminary step, obtaining the lime by heating limestone to cause it to decompose according to the reaction:

$$CaCO_3(limestone) \rightarrow CaO(lime) + CO_2\uparrow.$$

In this case, when the limestone contains, as impurities, substances other than calcium carbonate, the method may include heating the limestone in powder form to produce pure lime particles and impure lime particles, the adding of the lime to water taking place in a said lime treatment stage which is made up of a plurality of lime treatment reaction zones arranged in series, the method including separating the lime particles into a pure fraction and an impure fraction, which fractions are fed to the lime treatment reaction zones, lime from the pure fraction being fed to one or more lime treatment reaction zones which are later in the series than any lime treatment reaction zones to which lime from the impure fraction is fed, lime from the impure fraction being fed to one or more lime treatment reaction zones which are earlier in the series than any lime treatment reaction zones to which lime from the pure fraction is fed.

Sludge obtained from the neutralization step and any lime pretreatment step, and sludge from the lime treatment step, can be discarded on a waste dump, or can be used to recover metals contained therein, such as Fe, Al, Mg, Mn, Zn, Ca or the like, as it will contain compounds such as $Fe(OH)_2$, $Mn(OH)_2$, $Mg(OH)_2$, $Zn(OH)_2$, $Fe(OH)_3$, $Al(OH)_3$, $3CaSO_4 \cdot Al_2O_3 \cdot 3CaO \cdot 31H_2O$ (ettringite), $CaSO_4 \cdot 2H_2O$ (gypsum), $CaSO_4 \cdot \frac{1}{2}H_2O$, $CaSO_4$ and the like. If desired, aluminium cations, for example as aluminium hydroxide, may be added to the water, before or in the lime treatment step, or the later lime treatment stages when there are several, to promote the precipitation of ettringite in such lime treatment stages. In other words, the method may include the step of admixing aluminium cations into the water being treated, no later than the lime treatment stage, to promote the precipitation of ettringite in the lime treatment stage. If desired, a coagulant and/or a flocculant may be added to either or both of the lime treatment stage and the calcium carbonate precipitation stage.

In particular, if the sludge is $Mg(OH)_2$-rich, it can be used for neutralization of acid water, such as is obtained from coal washing in a coal processing plant. The $Mg(OH)_2$ in such sludge can raise the pH of such spent coal washing water to about 10, and other compounds such as gypsum and other metal hydroxides in the sludge need cause no problem as they can, together with any excess solid $Mg(OH)_2$, be separated, with waste coal fines, in a thickener forming part of the coal processing plant, from which they can be pumped with the coal fines to a coal discard dump. Clear water from the coal discard dump which is returned for re-use in the coal processing plant can undergo a build-up in the $MgSO_4$ content thereof, but this $MgSO_4$ forms no scale layer on the equipment of the coal processing plant. Gypsum scale layers on such equipment can, in contrast, be a problem when coal processing plant water is neutralized with lime. High $MgSO_4$ levels in the coal processing plant water can be reduced or controlled by treating a side stream thereof with $Ca(OH)_2$ according to the reaction:

$$MgSO_4 + Ca(OH)_2 \rightarrow Mg(OH)_2\downarrow + CaSO_4(s \text{ and } aq)$$

the Mg(OH)$_2$ precipitating, and some of the CaSO$_4$ precipitating as gypsum (CaSO$_4$.2H$_2$O), the side stream being recycled to reduce the overall MgSO$_4$ concentration in the coal processing plant water. Any Mg$^{2+}$ requirements can be met by replacing a proportion of the limestone bulk supply with dolomite, and any excess Mg$^{2+}$ can simply be discarded to waste as Mg(OH)$_2$. It follows that, when the raw water contains Mg$^{2+}$ cations which lead to the production of a magnesium hydroxide-containing sludge in the neutralization stage, the method may include adding the sludge to coal washing water containing sulphuric acid, the coal washing water circulating through a coal washing plant and the magnesium hydroxide in the sludge reaction with the sulphuric acid in the coal washing water according to the reaction:

$$H_2SO_4 + Mg(OH)_2 \rightarrow MgSO_4 + H_2O.$$

With regard to the neutralization step and the lime treatment step, these steps can each be carried out in a reactor such as a completely mixed reactor, a column reactor, a fluidized bed reactor, a spiral reactor or in a stage formed by a plurality of such reactors in series, with regard to the direction of water flow.

In the case of the neutralization step, the neutralization may be carried out, for example, as described in U.S. Pat. No. 5,156,746 or as described in International Patent Application PCT/GB98/01912 published as WO 99/01383.

In each case, for either the neutralization step or the lime treatment step, a series of completely mixed reactors (incorporating respective settling stages), a series of column reactors or a series of fluidized bed reactors can be used. When a spiral reactor is used, the calcium carbonate being added in the neutralization step, or the Ca(OH)$_2$ and/or CaO being added in the lime treatment step, can be added at a plurality of spaced positions along the spiral of the reactor, along which spiral the water flows, so that the addition has the same effect as addition thereof in each of a series of reactors making up the stage in question. Thus, when metals are present as cations in the raw water and are precipitated, for example as the hydroxides, at different pH's, each of a plurality of reactors making up the neutralization stage or making up the lime treatment stage may be operated at a particular pH (or various parts of a spiral reactor may each be operated at a particular pH), the pH being selected to precipitate predominantly a particular metal hydroxide, which hydroxide, if separated from the water in or after that reactor or reactor part, can be used as a source for the recovery of the metal in question. Thus, as the pH of the lime treatment stage increases during the lime treatment step, Zn(OH)$_2$ precipitation occurs at a pH of 8, Mn(OH)$_2$ precipitation occurs at a pH of 9.5, Mg(OH)$_2$ precipitation occurs at a pH of 11, while gypsum crystallization and precipitation is promoted by high pH's such as 12.4 or more. Gypsum crystallization occurs gradually with calcium carbonate/lime addition in the various stages of the method, up to a maximum pH of 12.5 where lime solubility becomes the limiting factor regarding gypsum crystallization. The lime neutralization step may thus be carried out in a series of reactors where the pH is increased stepwise to 8, 9.5, 11 and eventually to 12.4. While Mn(OH)$_2$ will precipitate at a pH of 9.5, its precipitation as MnO$_2$ can be promoted by aeration at pH 11 to oxidize the Mn$^{2+}$ to Mn$^{4+}$. If metal recovery is not important, a single stage can naturally be employed.

As regards metal recovery from the various precipitated sludges, this can be effected by selective dissolution thereof during a stepwise pH reduction by means of CO$_2$. Thus, for example, magnesium dissolves as Mg$^{2+}$ at a pH of 9.5–11, manganese dissolves as Mn$^{2+}$ at a pH of 8–9.5, and zinc dissolves as Zn$^{2+}$ at a pH of 6–8.5. With decreasing pH calcium in precipitated gypsum will also dissolve as Ca$_{2+}$ and will then precipitate as CaCO$_3$ by reacting with HCO$_3^-$ anions arising from dissolved CO$_2$. At pH's below 8, this CaCO$_3$ will also dissolve. In this way, solutions containing predominantly dissolved Mg$^{2+}$ anions, Mn$^{2+}$ anions, Zn$_{2+}$ anions or Ca$_{2+}$ anions can be obtained, from which solutions these metals can be recovered. Any residual sludge can be added to sludge from the neutralization step or from the lime treatment step for disposal to waste.

It follows that, when the raw water contains a plurality of species of metal cations, the neutralization stage of the lime treatment stage may each be divided into a plurality of reaction zones, each reaction zone having a different pH, the pH's of the reaction zones being selected to promote the production of respective sludges therein which differ from one another with regard to the proportions of different metals contained therein. In particular, when the plurality of species of metal cations contained in the raw water is made up of species selected from the group consisting of Fe$^{3+}$, Fe$^{2+}$, Al$^{3+}$, Ti$^{2+}$, Zn$^{2+}$Mn$^{2+}$, Mg$^{2+}$ and Ca$^{2+}$ cations, the reaction zones of the neutralizing stage and of the lime treatment stage may have respective pH's of <6, 6–8, 8–8.5, 8.5–9.5, 9.5–11, 11–12.4 and >12.4.

In a particular embodiment of the invention, the lime treatment step can be carried out in a lime treatment stage formed from two reactors incorporating settling stages or clarifiers, in the earlier one of which the pH is raised to 11, to cause precipitation of all the above metals from solution, other than calcium, and in the later of which reactors aluminium hydroxide is added while the pH is raised to 12.4 with lime to cause precipitation of ettringite as 3CaSO$_4$.Al$_2$O$_3$.3CaO.31H$_2$O, for example as described in South African Patent 98/4724. The ettringite-containing sludge can then have its pH reduced to below 7, for example using carbon dioxide from the neutralizing step, to cause decomposition of the ettringite to insoluble Al(OH)$_3$ and calcium sulphate in solution. The calcium sulphate in solution can be recycled to the neutralization step or to an early part of the lime treatment step where the pH is about 11, for gypsum crystallization and precipitation therefrom, and the Al(OH)$_3$ can be returned to the high-pH reactor of the lime treatment stage for ettringite formation, or it can be discarded to waste or used for aluminium recovery. In this case, when the Ca(OH)$_2$ is separated, as described above, into an impure fraction and a pure fraction by gravimetric separation in a fluidized bed, impure Ca(OH)$_2$ from the bottom of the bed can be dosed into the reactor whose pH is raised to 11 whose sludge is discarded to waste or is used for selective metal recovery, pure Ca(OH)$_2$ from the top of the bed being used in the reactor whose pH is raised to 12.4, to form the ettringite, to reduce any build-up of impurities in the ettringite-containing sludge.

Water from the calcium carbonate precipitation step, typically at a pH of 8.3, can have the residual sulphate content thereof reduced, eg to less than 200 mg/l, and at a pH of 8–9, by biological treatment thereof, for example as described in said PCT/GB98/01912 (WO 99/01383), or by the addition thereto of BaS and/or BaO, in the final treatment step. In the case of BaS or BaO addition, the sulphate is precipitated as BaSO$_4$, after which the pH of the water can be reduced to acceptably neutral levels using carbon dioxide obtained from the neutralization step. When BaS is employed, S$^{2-}$ sulphide anions can be stripped as H$_2$S by means of carbon dioxide from the water and converted to sulphur, while calcium carbonate will precipitate from the water if excess carbon dioxide is stripped by air from the water. When BaO is employed, $Ca^{2+}$ is precipitated as $CaCO_3$ by contacting it with carbon dioxide. When biological treatment is employed, $H_2S$ is produced, which is stripped from the water by means of carbon dioxide, excess carbon dioxide in turn being stripped from the water, as described above for BaS addition, to cause or permit calcium carbonate precipitation. Calcium carbonate or $H_2S$ or sulphur can be returned to the neutralization step where the calcium carbonate will act to neutralize the water, while the $H_2S$ and sulphur will be oxidized to $H_2SO_4$ ($S+1.5O_2+H_2O \rightarrow H_2SO_4$ or $H_2S+O_2 \rightarrow H_2SO_4$) and this $H_2SO_4$ will then automatically be treated according to the method of the invention.

In particular, the method may thus include, after the lime treatment stage, reducing the dissolved sulphate ion content of the water; and reducing the dissolved sulphate ion content of the water may be by biologically treating the water to reduce the sulphate ion content thereof to a value of <200 mg/l.

It is contemplated that raw waters which will typically be treated according to the method of the invention will have the following composition:

| | |
|---|---|
| pH | 2–4 |
| Sulphate Content | 1500–40000 mg/l (as $SO^{2-}_4$) |
| Alkalinity | 0 mg/l (as $CaCO_3$) |
| Calcium Content | 0–16000 mg/l (as $Ca^{2+}$) |
| Magnesium Content | 0–2000 mg/l (as $Mg^{2+}$) |
| Manganese Content | 0–400 mg/l (as $Mn^{2+}$) |
| Aluminium Content | 0–600 mg/l (as $Al^{3+}$) |
| Iron (II) Content | 0–1000 mg/l (as $Fe^{2+}$) |
| Free Acid Content | 900–50000 mg/l (as $CaCO_3$) |
| Total Dissolved Solids Content | 6500–60000 mg/l. |

After the neutralization step the water can have the following composition:

| | |
|---|---|
| pH | 6–8 |
| Sulphate Content | 1200–4800 mg/l |
| Alkalinity | 0 mg/l |
| Calcium Content | 300–1200 mg/l |
| Magnesium Content | 0–400 mg/l |
| Manganese Content | 0–400 mg/l |
| Aluminium Content | 0–5 mg/l |
| Iron (II) Content | 0–5 mg/l |
| Free Acid Content | 0–60 mg/l |
| Total Dissolved Solids Content | 1600–6500 mg/l. |

After the lime treatment step the water can have the following composition:

| | |
|---|---|
| pH | 11–13 |
| Sulphate Content | 600–3000 mg/l |
| Alkalinity Content | 50–2000 mg/l |
| Calcium Content | 400–2000 mg/l |
| Magnesium Content | 0–5 mg/l |
| Manganese Content | <1 mg/l |
| Aluminium Content | 0–5 mg/l |
| Iron (II) Content | <1 mg/l |
| Free Acid Content | <1 mg/l |
| Total Dissolved Solids Content | 1400–5600 mg/l. |

After the calcium carbonate precipitation step the water can have the following composition:

| | |
|---|---|
| pH | 8–9 |
| Sulphate Content | 600–2400 mg/l |
| Alkalinity | 50–200 mg/l |
| Calcium Content | 50–1000 mg/l |
| Magnesium Content | 0–5 mg/l |
| Manganese Content | <1 mg/l |
| Aluminium Content | <1 mg/l |
| Iron (II) Content | <1 mg/l |
| Free Acid Content | <1 mg/l |
| Total Dissolved Solids Content | 900–3600 mg/l. |

Finally, after the final sulphate reduction step, eg by biological treatment thereof, the product water can have the following composition:

| | |
|---|---|
| pH | 7–9 |
| Sulphate Content | 100–400 mg/l |
| Alkalinity | 70–300 mg/l |
| Calcium Content | 70–300 mg/l |
| Magnesium Content | 0–5 mg/l |
| Manganese Content | <1 mg/l |
| Aluminium Content | <1 mg/l |
| Iron (II) Content | <1 mg/l |
| Free Acid Content | <1 mg/l |
| Total Dissolved Solids Content | 200–900 mg/l. |

In a typical case, a coal discharge leachate, when treated in accordance with the method of the present invention can have various compositions set out in the following Table, when raw and when treated by the various steps of the method:

TABLE

| | Water Composition | | | | |
|---|---|---|---|---|---|
| Parameter | Raw | After Neutralization | After Lime Treatment | After $CaCO_3$ Precipitation | After Biological Treatment |
| pH | 2.2 | 7.1 | 12.0 | 8.3 | 8.1 |
| Sulphate Content (mg/l) | 9200 | 2410 | 1230 | 1220 | 205 |
| Alkalinity Content (mg/l) | 0 | 0 | 1000 | 100 | 150 |
| Calcium Content (mg/l) | 377 | 639 | 903 | 543 | 140 |
| Magnesium Content (mg/l) | 202 | 200 | 3 | 3 | 3 |
| Manganese Content (mg/l) | 20 | 20 | 0 | 0 | 0 |
| Aluminium Content (mg/l) | 106 | 3 | 2 | 0 | 0 |
| Iron (II) Content (mg/l) | 3040 | 4 | 0 | 0 | 0 |
| Free Acid Content (mg/l) | 1740 | 30 | 0 | 0 | 0 |
| Total Dissolved Solids Content (mg/l) | 12945 | 3276 | 2738 | 1826 | 438 |

The method of the present invention will typically be carried out at ambient temperatures and under atmospheric pressure, temperatures of the various steps thus being in the range of 0–100° C., usually 10–50° C., for example 10–40° C. A feature of the lime treatment stage when CaO is used is that it can assist in raising water temperatures to the range 10–40° C., suitable for any biological treatment stage.

The invention will now be described, by way of example, with reference to the accompanying drawings, in which.

Figure 1:
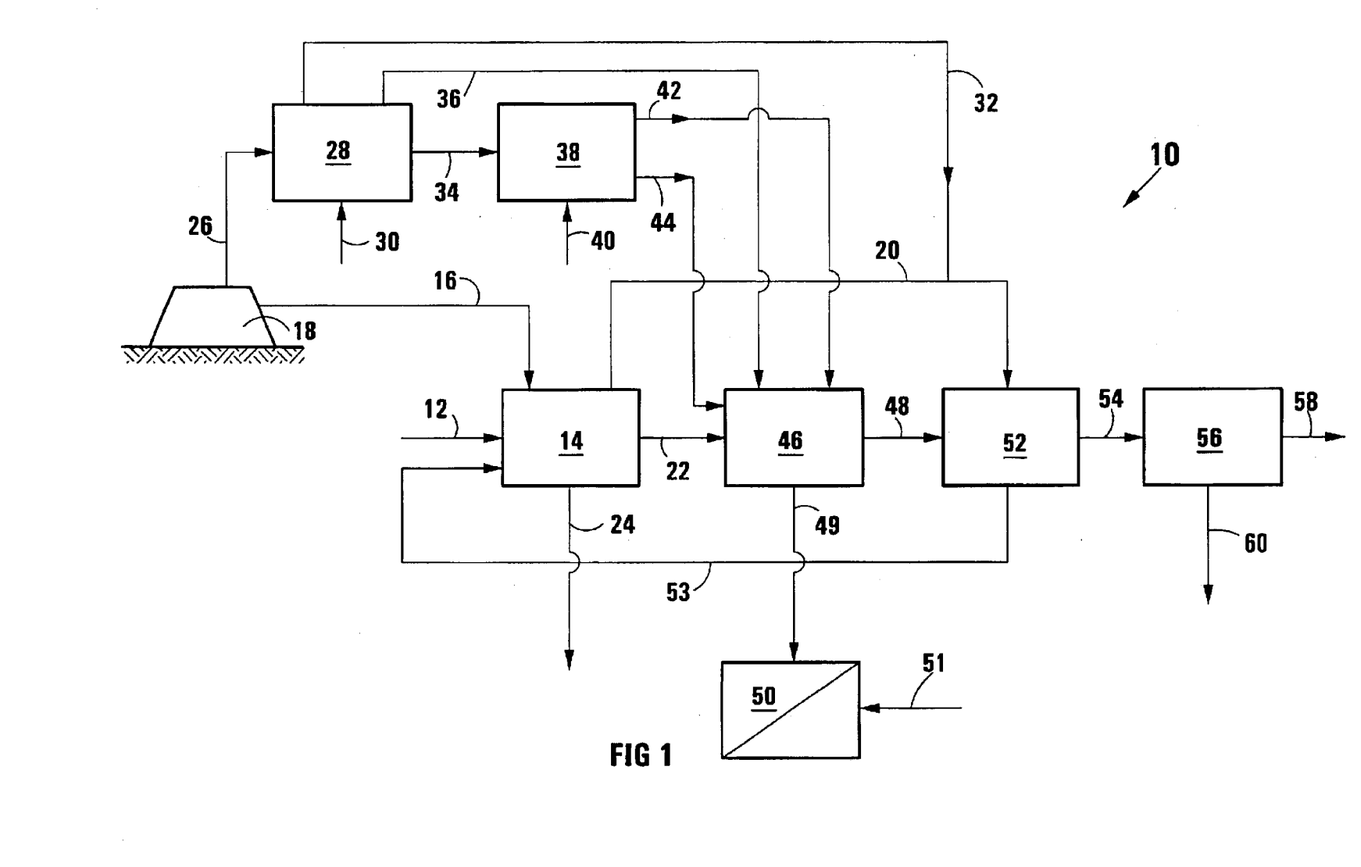
FIG. 1 shows a schematic flow diagram of a method in accordance with the present invention.

In FIG. 1 of the drawings, reference numeral 10 generally designates a schematic flow diagram of a method in accordance with the invention. In the flow diagram a raw water feed line is designated 12, and is shown feeding into a neutralization stage 14 incorporating a settling stage. A calcium carbonate powder feed line 16, leading from a calcium carbonate powder bulk supply 18, is also shown feeding into stage 14. A carbon dioxide discharge line 20 and a water discharge line 22 are shown issuing from stage 14, as is a sludge discharge line 24.

From the bulk supply 18, a calcium carbonate powder feed line 26 feeds to a calcium carbonate burning stage 28 provided with a fuel (coal) supply line 30, and with a carbon dioxide discharge line 32 issuing therefrom. A pair of calcium oxide discharge lines 34, 36 issue from burning stage 28, the line 34 leading to a fluidized bed gravimetric separation stage 38 provided with a fluidizing water supply line 40 and a pair of calcium hydroxide discharge lines 42, 44.

The water discharge line 22 from the neutralization stage 14 and the calcium oxide discharge line 36 from the lime burning stage 28 lead to the lime treatment stage 46. The calcium hydroxide discharge line 42 from the gravimetric separation stage 38 leads to the later part of the lime treatment stage 46, and the lime 44 from the separation stage 38 leads to the earlier part of the lime treatment stage 46. The line 44 from the separation stage 38 leads to the earlier part of the lime treatment stage 46. The lime treatment stage 46 incorporates a settling stage and has a water discharge line 48 and a sludge discharge line 49. The sludge discharge line 49 leads to a metal recovery stage 50 fed by a carbon dioxide supply line 51, which may branch (not shown) from either line 20 or line 32.

Water discharge line 48 discharges from lime treatment stage 46 into a calcium carbonate precipitation stage 52, which is fed by carbon dioxide flow line 20, flow line 20 in turn being fed by carbon dioxide discharge line 30 from lime burning stage 28. Calcium carbonate precipitation stage 50 has a calcium carbonate sludge discharge line 53 feeding into neutralization stage 14, and a water discharge line 54 leading into a biological treatment stage 56. The biological treatment stage 56 is a final treatment stage for the water and incorporates a sludge settling stage. Thus, the final (biological) treatment stage has a product water outlet line 58 and a sludge discharge line 60.

Figure 2:
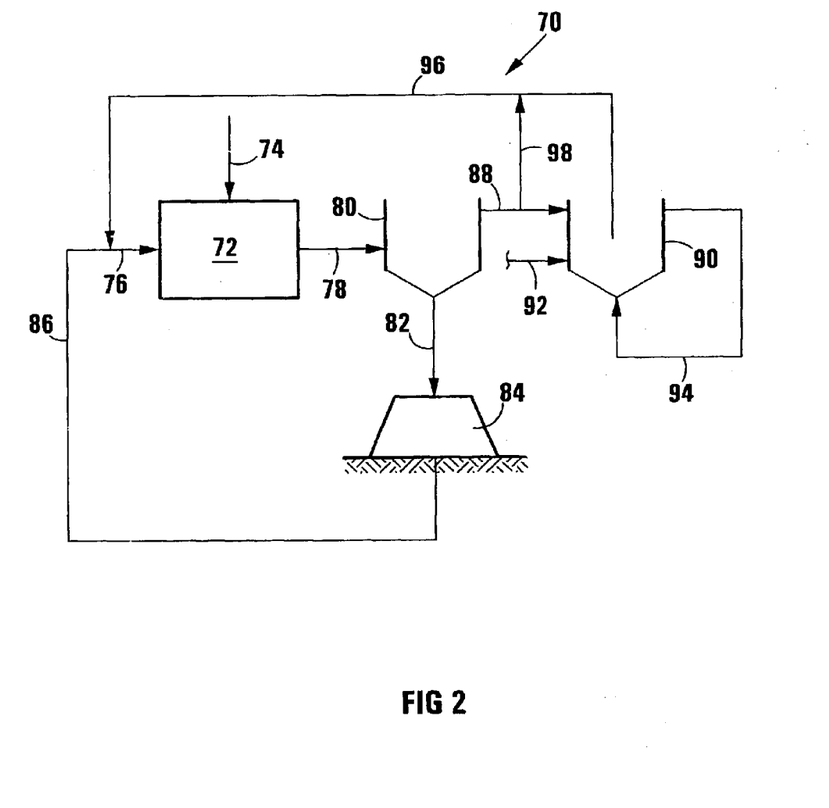
FIG. 2 shows a schematic flow diagram of an optional variation of the method of FIG. 1

In FIG. 2, a variation of the method illustrated by the flow diagram of FIG. 1 is generally designated 70, illustrating the treatment of water in a coal processing plant, designated 72. The plant 72 is shown fed by a coal feed line 74 and by a water supply line 76 for coal washing water. The plant 72 has a spent water discharge line 78 leading to a thickener stage 80 which has a solids (sludge) discharge line 82 leading to a waste dump 84. The dump 84 in turn has a clear water discharge line 86 leading into the water supply line 76.

A side stream flow line 88 is shown feeding from the thickener stage 80 to a contact reaction stage 90 such as a fluidized bed reactor or a completely mixed reactor/clarifier combination which is also fed by a calcium hydroxide supply line 92. The reactor has a recirculation line 94 for fluidizing suspended material (gypsum) if the reaction stage is a fluidized bed reactor; or, when the reaction stage is a completely mixed reactor associated with a clarifier or settling stage, the recirculation line 94 returns sludge from the clarifier to the reactor; and the reactor has a slurry discharge line 96 which feeds into the water supply line 76. A branch line 98 feeds from the side stream flow line 88 into the slurry discharge line 96.

In accordance with the method of the present invention and with reference to FIG. 1 of the drawings, a raw water, typically having a composition as set forth in the Table hereinabove, is fed along feed line 12 into the neutralization stage 14, together with calcium carbonate powder fed from the bulk supply 18 along feed line 16 into the stage 14. In the neutralization stage the pH of the water is reduced by the reactions:

$$H_2SO_4 + CaCO_3 \rightarrow CaSO_4 + H_2O + CO_2\uparrow;$$

and $$H_2SO_4 + Ca(OH)_2 \rightarrow CaSO_4 + 2H_2O.$$

In this example the stage 14 is provided by a completely mixed reactor/settler combination which incorporates a reaction stage and a settling stage from which sludge is recycled to the reaction stage to maintain a solids content in the neutralization stage 14 of 10–300 g/l. This sludge includes $Fe(OH)_3$ and $Al(OH)_3$ which are precipitated from the raw water, and calcium sulphate crystallized and precipitated from the water as gypsum. The pH of the water is increased from about 2 in the raw water, to about 7 after neutralization, the solids content of 10–300 g/l promoting oxidation of $Fe^{2+}$ in the water to $Fe^{3+}$ by aeration arising from the mixing, for effective $Fe(OH)_3$ precipitation, and the solids also promoting good $CaSO_4.2H_2O$ crystallization. Excess sludge is discharged from stage 14 to waste along line 24, and carbon dioxide produced issues from stage 14 along line 20.

Neutralized water passes from stage 14 along discharge line 22 to lime treatment stage 46. Stage 46 is fed with calcium oxide from burning stage 28 along line 36, and/or stage 46 is fed in the later part thereof with pure calcium hydroxide from gravimetric separation stage 38 along line 42, while the earlier part of stage 46 is fed with impure calcium hydroxide from separation stage 38 along line 44. In this regard it is to be noted that powdered lime stone is fed from bulk supply 18 along line 26 to burning stage 28 where it is burnt at about 860° C. to form calcium oxide and carbon dioxide according to the reaction:

$$CaCO_3 \rightarrow CaO + CO_2\uparrow$$

Calcium oxide is fed from stage 28, as described above, along line 36 to stage 46, where it contributes to heating the water, and is also fed along line 34 to gravimetric separation stage 38 which is fed with water along supply line 40. In stage 38 the calcium oxide reacts with water to form calcium hydroxide according to the reaction:

$$CaO + H_2O \rightarrow Ca(OH)_2.$$

The calcium hydroxide formed in stage 38 is gravimetrically separated in the fluidized bed in the stage 38, fluidized by the water fed along line 40, into a top pure fraction which passes along line 42 to the later part of stage 46, and a bottom impure fraction which passes along line 44 to the earlier part of stage 46, as described above. The carbon hydroxide produced in burning stage 28 passes along line 32 to line 20.

In lime treatment stage 46 the calcium hydroxide from line 42 and the calcium oxide from line 36 react with sulphuric acid, increasing the Ph of the water to 12, according to the reactions:

Calcium sulphate crystallizes as gypsum ($CaSO_4.2H_2O$) at below 30° C. (or as $CaSO_4.\frac{1}{2}H_2O$ at 30–80° C. or as $CaSO_4$ at 70–110° C.) and issues from stage 46 along discharge line 49 as a sludge which contains $Zn(OH)_2$, $Mg(OH)_2$ and $Mn(OH)_2/MnO_4$, all of which precipitate as the pH of the water increases from about 7 to about 12. The lime treatment stage 46 incorporates a reaction stage and a settling stage from which solids are recirculated to the reaction stage, to keep the solids content at 10–300 g/l.

Water discharged from lime treatment stage 46 along discharge line 48 to calcium carbonate precipitation stage 52 is treated with carbon dioxide from line 20 to reduce its pH to 8.3 to cause calcium carbonate precipitation therefrom. This calcium carbonate passes as a sludge along line 53 to neutralization stage 14 where it supplements the calcium carbonate from line 16. Water issues from stage 52 along discharge line 54 to biological treatment stage 56. In biological treatment stage 56 the water is subjected to a biological treatment according to PCT/GB98/01912 (WO 99/01383) whereby its sulphate content and its total dissolved solids content are reduced, product water issuing from stage 56 along product water outlet line 58 and sludge issuing therefrom along sludge discharge line 60 to waste. Optionally, the sludge from line 60 can, if desired, be fed into line 53 for recirculation to neutralization stage 14.

Sludge passing along line 49 contains potentially valuable metals such as zinc, magnesium and manganese, and is treated in metal recovery stage 50 for the recovery of these metals. This is done by progressively acidifying the water, using carbon dioxide from line 51, to dissolve the metals in question. Thus, magnesium sulphate goes into solution at a pH of 9.5–11 while manganese sulphate goes into solution at a pH of 8–9.5 and zinc sulphate goes into solution at a pH of 6–8.5, from which solutions these metals can be recovered.

In a variation of the method of the invention aluminium hydroxide can be fed to the lime treatment stage, to promote the precipitation of ettringite ($3CaSO_4.Al_2O_3.3CaO.31H_2O$) as described in South African Patent 98/4724. This ettringite can be decomposed, by reduction of the pH of the sludge containing it, to less than 7, to form aluminium hydroxide $Al(OH)_3$ and calcium sulphate.

With reference to FIG. 2 a further variation of the invention is shown, whereby the metal recovery stage 50 of FIG. 1 is replaced by a coal processing plant wherein magnesium hydroxide-rich slurry from line 49 is used to treat coal washing water. In accordance with this variation of the method, slurry from discharge line 49 (FIG. 1) is fed into coal washing water at one or more points (not shown) in the coal processing plant 72 (FIG. 2), to which coal is fed along coal feed line 74 and waste water is fed along supply line 76.

In the wash water in the plant 72, magnesium hydroxide reacts with sulphuric acid from the coal washing according to the reaction:

while any small quantities calcium hydroxide in the slurry react in analogous fashion. A progressive build-up of dissolved magnesium sulphate in the coal wash water takes place, as it circulates along line 78 to the thickener stage 80 where coal fines are settled, and from which a slurry is discharged along line 82 into the waste dump 84. Clear water draining from the dump 84 is circulated along line 86 to the water supply line 76.

To counteract this build-up of dissolved magnesium sulphate in the coal wash water, a side stream of water is removed from the thickener stage 80 along line 88 to the contact reaction stage 90. Calcium hydroxide is dosed into the contact reaction stage 90 along supply line 92 (which can receive calcium oxide from line 34 or line 36—FIG. 1) and recirculation of the contents of the reaction stage 90 takes place along recirculation line 94. In the reaction stage 90 the magnesium sulphate reacts with the calcium hydroxide according to the reaction:

and a slurry of water containing precipitated $Mg(OH)_2$ and gypsum ($CaSO_4.2H_2O$) leaves the reaction stage 90 along slurry discharge line 96 which feeds into water supply line 76. The bulk of the water from thickener stage 80 bypasses reaction stage 90, and passes directly into line 96 via the branch line 98. The part of line 96 which is upstream of the connection of line 96 to branch line 98 has its flow controlled by the acid load of water from line 74 and by the solid magnesium hydroxide concentration in said part of line 96. The amount of calcium hydroxide dosed along line 92 into reaction stage 90 depends on the amount of sulphuric acid leached out of the coal in plant 72, by the magnesium hydroxide, which acts as an intermediate alkali, and which is precipitated in reaction stage 90.

The invention extends also to a method of treating neutral water containing sulphate anions which omits the neutralization step described above, but combines the lime treatment step with one or more of the additional method steps described above, for example with the magnesium hydroxide treatment step described above with particular reference to FIG. 2, or with the calcium carbonate precipitation step described above and with reference to FIG. 1.

It is an advantage of the invention that it provides a versatile and effective method for treating acid waters containing sulphate anions and metal cations.

What is claimed is:

1. A method of treating acid raw water containing sulphate anions, the method including the steps of neutralising the raw water by adding calcium carbonate to the raw water in a neutralising stage, rendering the neutralised water alkaline or more alkaline by adding thereto an alkali selected from the group consisting of calcium hydroxide, calcium oxide and mixtures thereof in a lime treatment stage, and then treating alkaline water from the lime treatment stage with carbon dioxide in a carbon dioxide treatment stage, the carbon dioxide reacting, in the carbon dioxide treatment stage, with calcium hydroxide dissolved in the water to precipitate calcium carbonate, the treating of the alkaline water with carbon dioxide including feeding carbon dioxide produced in the neutralising stage according to the reaction:

into the alkaline water from the lime treatment stage, to react with calcium hydroxide in the water at a pH of not less than 8.3 according to the reaction:

$$Ca(OH)_2 + CO_2 \rightarrow CaCO_3 \downarrow + H_2O$$

calcium carbonate produced as a precipitate in the carbon dioxide treatment stage forming at least part of the calcium carbonate added to the raw water in the neutralising stage, the alkali addition in the lime treatment stage acting to precipitate one or more calcium sulphate-containing compounds, the process including separation of calcium sulphate-containing precipitate from the water issuing from the lime treatment stage before it is treated with carbon dioxide in the carbon dioxide treatment stage, and the carbon dioxide fed into the carbon dioxide treatment stage acting to render the water issuing from the carbon dioxide treatment stage undersaturated with regard to calcium sulphate.

2. A method as claimed in claim 1, in which the carbon dioxide treatment lowers the pH of the carbon dioxide treatment stage to a minimum value of not less than 8.6.

3. A method as claimed in claim 1, in which the neutralising of the raw water is by adding particulate calcium carbonate thereto and acts to increase the pH of the raw water from a value of below 5, to a value, in the neutralised water, of 5–8.5, the rendering of the neutralised water alkaline or more alkaline acting to raise the pH of the water to a value of 9–12.6, before the treating of the alkaline water with carbon dioxide takes place.

4. A method as claimed in claim 1, in which the raw water contains sulphate anions, calcium cations and one or more metal cations selected from the group consisting of $Fe^{3+}$, $Fe^{2+}$, $Al^{3+}$, $Ti^{2+}$, $Zn^{2+}$, $Mn^{2+}$ and $Mg^{2+}$ cations, the method including separating from the water as a sludge the hydroxides of any metal cations of said group which are present in the raw water and which give rise to solid hydroxides in the neutralising step, and recirculating sufficient of the separated sludge to the neutralising step to maintain a solids concentration of 5–300 g/l in the neutralising stage.

5. A method as claimed in claim 4, in which the raw water contains $Fe^{2+}$ cations, the method including agitating and aerating water in the neutralising stage to promote oxidation of the $Fe^{2+}$ cations to $Fe^{3+}$ cations in the neutralising stage.

6. A method as claimed in claim 1, in which solid calcium sulphate forms in the water in the lime treatment stage, the method including the step of separating a calcium sulphate-containing sludge from the water in the lime treatment stage before the treating of the alkaline water with carbon dioxide takes place.

7. A method as claimed in claim 1, in which adding the alkali to the neutralised water is by adding lime thereto, the method including, as a preliminary step, obtaining the lime by heating limestone to cause it to decompose according to the reaction:

$$CaCO_3(\text{limestone}) \rightarrow CaO(\text{lime}) + CO_2 \uparrow.$$

8. A method as claimed in claim 7, in which the limestone contains, as impurities, substances other than calcium carbonate, the method including heating the limestone in powder form to produce pure lime particles and impure lime particles, and the adding of the lime to the water taking place in a said lime treatment stage which is made up of a plurality of lime treatment reaction zones arranged in series, the method including separating the lime particles into a pure fraction and an impure fraction, which fractions are fed to the lime treatment reaction zones, lime from the pure fraction being fed to one or more lime treatment reaction zones which are later in the series than any lime treatment reaction zones to which lime from the impure fraction is fed, lime from the impure fraction being fed to one or more lime treatment reaction zones which are earlier in the series than any lime treatment reaction zones to which lime from the pure fraction is fed.

9. A method as claimed in claim 1, which includes the step of admixing aluminium cations into the water being treated, no later than the lime treatment stage, to promote the precipitation of ettringite in the lime treatment stage.

10. A method as claimed in claim 1, in which the raw water contains $Mg^{2+}$ cations which lead to the production of a magnesium hydroxide-containing sludge in the neutralisation stage, the method including adding the sludge to coal washing water containing sulphuric acid, the coal washing water circulating through a coal washing plant and the magnesium hydroxide in the sludge reacting with the sulphuric acid in the coal washing water according to the reaction:

$$H_2SO_4 + Mg(OH)_2 \rightarrow MgSO_4 + H_2O.$$

11. A method as claimed in claim 1, in which the raw water contains a plurality of species of metal cations, the neutralisation stage and the lime treatment stage each being divided into a plurality of reaction zones, each reaction zone having a different pH, the pH's of the reaction zones being selected to promote the production of respective sludges therein which differ from one another with regard to the proportions of different metals contained therein.

12. A method as claimed in claim 11, in which the plurality of species of metal cations contained in the raw water is made up of species selected from the group consisting of $Fe^{3+}$, $Fe^{2+}$, $Al^{3+}$, $Ti^{2+}$, $Zn^{2+}$, $Mn^{2+}$, $Mg^{2+}$ and $Ca^{2+}$ cations, the reaction zones of the neutralising stage and of the lime treatment stage having respective pH's of <6, 6–8, 8–8.5, 8.5–9.5, 9.5–11, 11–12.4 and >12.4.

13. A method as claimed in claim 1, which includes, after the lime treatment stage, reducing the dissolved sulphate ion content of the water.

14. A method as claimed in claim 13, in which reducing the dissolved sulphate ion content of the water is by biologically treating the water to reduce the sulphate ion content thereof to a value of <200 mg/l.

15. A method of treating acid raw water containing sulphate anions, the method including the steps of neutralising the raw water by adding calcium carbonate to the raw water in a neutralising stage, rendering the neutralized water alkaline or more alkaline by adding thereto an alkali selected from the group consisting of calcium hydroxide, calcium oxide and mixtures thereof in a lime treatment stage, and then treating alkaline water from the lime treatment stage with carbon dioxide in a carbon dioxide treatment stage, the carbon dioxide reacting, in the carbon dioxide treatment stage, with calcium hydroxide dissolved in the water, the treating of the alkaline water with carbon dioxide including feeding carbon dioxide produced in the neutralising stage according to the reaction:

$$H_2SO_4 + CaCO_3 \rightarrow CaSO_4 + H_2O + CO_2 \uparrow$$

into the alkaline water from the lime treatment stage, to react with calcium hydroxide in the water at a pH of not less than 8.3 according to the reaction:

$$Ca(OH)_2 + CO_2 \rightarrow CaCO_3 \downarrow + H_2O,$$

adding the alkali to the neutralised water being by adding lime thereto, the method including, as a preliminary step, obtaining the lime by heating limestone to cause it to decompose according to the reaction:

$$CaCO_3(\text{limestone}) \rightarrow CaO(\text{lime}) + CO_2\uparrow,$$

the limestone containing, as impurities, substances other than calcium carbonate, the method including heating the limestone in powder form to produce pure lime particles and impure lime particles, and the adding of the lime to the water taking place in a said lime treatment stage which is made up of a plurality of lime treatment reaction zones arranged in series, the method including separating the lime particles into a pure fraction and an impure fraction, which fractions are fed to the lime treatment reaction zones, lime from the pure fraction being fed to one or more lime treatment reaction zones which are later in the series than any lime treatment reaction zones to which lime from the impure fraction is fed, lime from the impure fraction being fed to one or more lime treatment reaction zones which are earlier in the series than any lime treatment reaction zones to which lime from the pure fraction is fed.

16. A method of treating acid raw water containing sulphate anions, the method including the steps of neutralising the raw water by adding calcium carbonate to the raw water in a neutralising stage, rendering the neutralised water alkaline or more alkaline by adding thereto an alkali selected from the group consisting of calcium hydroxide, calcium oxide and mixtures thereof in a lime treatment stage, and then treating alkaline water from the lime treatment stage with carbon dioxide in a carbon dioxide treatment stage, the carbon dioxide reacting, in the carbon dioxide treatment stage, with calcium hydroxide dissolved in the water, the treating of the alkaline water with carbon dioxide including feeding carbon dioxide produced in the neutralising stage according to the reaction:

$$H_2SO_4 + CaCO_3 \rightarrow CaSO_4 + H_2O + CO_2\uparrow$$

into the alkaline water from the lime treatment stage, to react with calcium hydroxide in the water at a pH of not less than 8.3 according to the reaction:

$$Ca(OH)_2 + CO_2 \rightarrow CaCO_3\downarrow + H_2O,$$

the raw water containing $Mg^{2+}$ cations which lead to the production of a magnesium hydroxide-containing sludge in the neutralisation stage, and the method including adding the sludge to coal washing water containing sulphuric acid, the coal washing water circulating through a coal washing plant and the magnesium hydroxide in the sludge reacting with the sulphuric acid in the coal washing water according to the reaction:

$$H_2SO_4 + Mg(OH)_2 \rightarrow MgSO_4 + H_2O.$$

* * * * *